US007609259B2

(12) United States Patent
McBagonluri et al.

(10) Patent No.: US 7,609,259 B2
(45) Date of Patent: Oct. 27, 2009

(54) SYSTEM AND METHOD FOR PERFORMING A SELECTIVE FILL FOR A HEARING AID SHELL

(75) Inventors: Fred McBagonluri, East Windsor, NJ (US); Artem Boltyenkov, Lawrenceville, NJ (US); Oleg Saltykov, Fair Lawn, NJ (US)

(73) Assignee: Siemens Audiologische Technik GmbH, Erlangen (DE)

( * ) Notice: Subject to any disclaimer, the term of this patent is extended or adjusted under 35 U.S.C. 154(b) by 482 days.

(21) Appl. No.: 11/583,593

(22) Filed: Oct. 18, 2006

(65) Prior Publication Data

US 2008/0094392 A1 Apr. 24, 2008

(51) Int. Cl.
*G06T 15/00* (2006.01)

(52) U.S. Cl. ....................... 345/419; 381/322; 381/323; 381/324; 381/328; 700/98; 700/163; 703/1

(58) Field of Classification Search ................. 345/419; 381/322-324, 328
See application file for complete search history.

(56) References Cited

U.S. PATENT DOCUMENTS

| | | | | |
|---|---|---|---|---|
| 6,533,062 | B1 * | 3/2003 | Widmer et al. | 181/129 |
| 6,920,414 | B2 * | 7/2005 | Tøpholm | 703/1 |
| 7,286,679 | B2 * | 10/2007 | Fang et al. | 381/322 |
| 7,308,328 | B2 * | 12/2007 | Fang et al. | 700/98 |

* cited by examiner

*Primary Examiner*—Kimbinh T Nguyen
(74) *Attorney, Agent, or Firm*—Schiff Hardin LLP

(57) ABSTRACT

A method and appertaining system load 3D shape information defining a hearing aid shell into a processor and present a representation of the shell on a display. A fill boundary is entered by a user operating a user input device and a fill region for the shell is thus defined. The fill boundary is then displayed, but can be modified by the user. Various checks may be performed to ensure that the fill region is a proper one, and if not, a status can be provided to the user indicating why the fill region is unacceptable. The displayed shell can be rotated and moved to assist the user. Once an acceptable fill region has been defined, an indication is provided by the user that the displayed fill region is to be used as the actual fill region.

27 Claims, 4 Drawing Sheets

SYSTEM AND METHOD FOR PERFORMING A SELECTIVE FILL FOR A HEARING AID SHELL

BACKGROUND

The present invention is directed to a system and method for performing a selective fill for a hearing aid shell.

Recent advances in hearing instrument technology have created the impetus for special adaptation of modeling software systems to facilitate optimum virtual assembly and fitting of hearing aid shell components. These requirements call for adaptations of software such that the final shell can be modified at the point of sale, utilize electro-acoustic advantages, as well as accounting factors, for ease-of-assembly.

SUMMARY

A system and method are provided in which a 3D Shell Modeling and Detailing application provides protocols for invoking a simplified mechanism for defining the parts of a hearing aid shell that are filled. Advantageously, a simple method is given for providing a filling of the parts of the shell in order to take advantage of the electro-acoustic effect that will help to reduce feedback. Furthermore, selective filling also enhances possibilities for manual modification at the point of sale because extra material can be safely removed from the shell in the places where selective fill was applied without physically damaging the instrument.

Abbreviations

The following abbreviations are used in this document:

| Abbreviation | Explanation |
|---|---|
| 3D | 3-Dimensional; |
| ASCII | A(merican) S(tandard) C(ode for) I(nformation) I(nterchange). A standard for assigning numerical values to the set of letters in the Roman alphabet and typographic characters; |
| COM | A model for binary code developed by Microsoft. The Component Object Model (COM) enables programmers to develop objects that can be accessed by any COM-compliant application; |
| DWOM | Digital Work Order Management; DWOM is the interface between 3D Shell Modeling and Detailing application and back-end/business systems that may be based, e.g., on Microsoft COM; |
| ITE | In-the-Ear; |
| N/A | Not Applicable; |
| UI | User Interface; |

Definitions

The following definitions are used in this document.

| Definition | Explanation |
|---|---|
| ear impression | 3D impression from a patient's ear. The actual physical impression is scanned by 3D scanners to create a pointcloud; |
| pointcloud | A set of 3D coordinates defining a 3D shape. Pointcloud files that come from 3D scanners are usually in ASCII format; |
| work order | An entry in DWOM that contains all information relevant for modelling a shell (or shells in case of binaural order) for the specific order of the ITE hearing instrument. |

DESCRIPTION OF THE DRAWINGS

Various embodiments of the invention are illustrated in the following figures and the appertaining descriptive portion.

DETAILED DESCRIPTION OF THE PREFERRED EMBODIMENTS

Figure 1A:
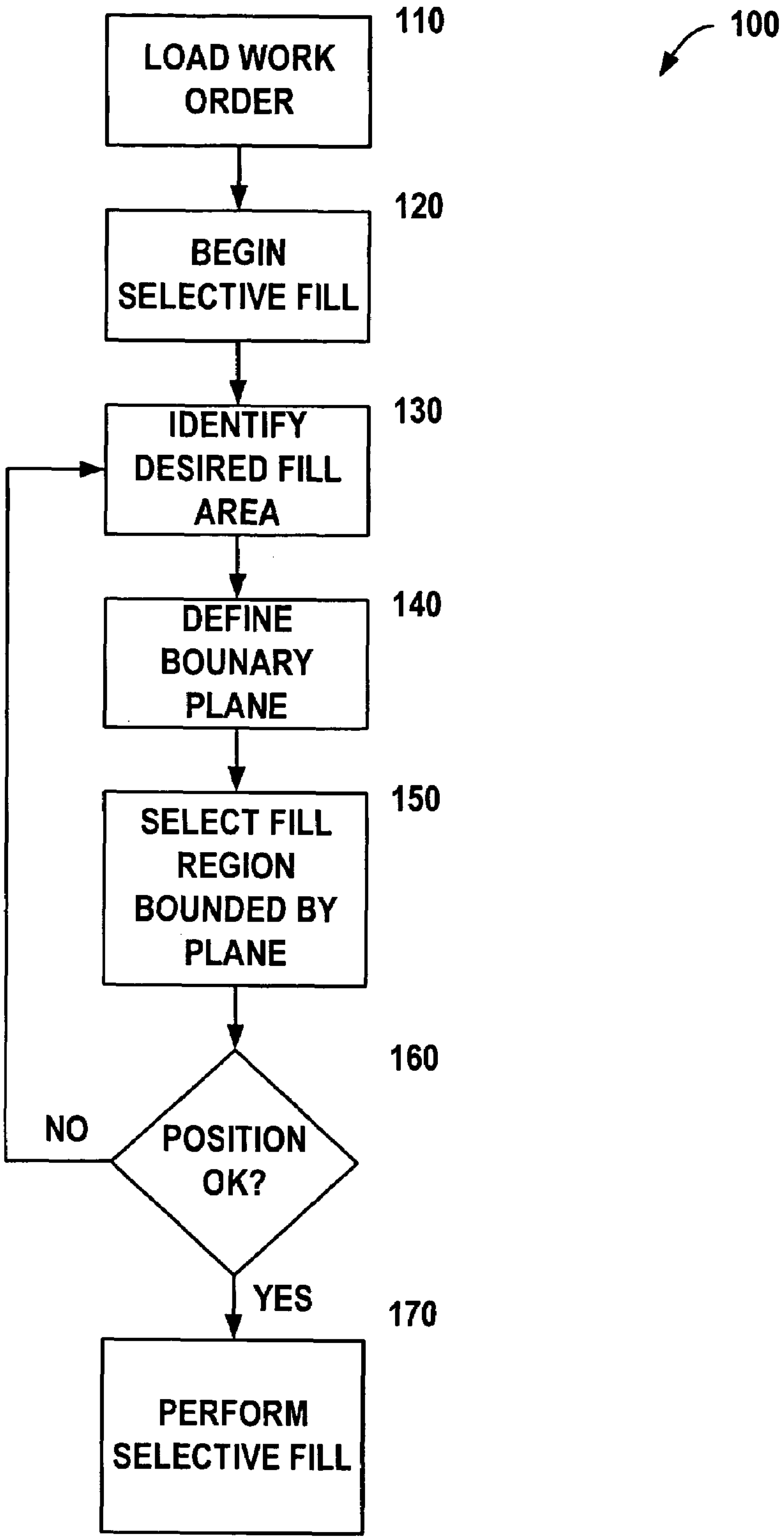
FIG. 1A is a flowchart illustrating the basic system flow.
Figure 1B:
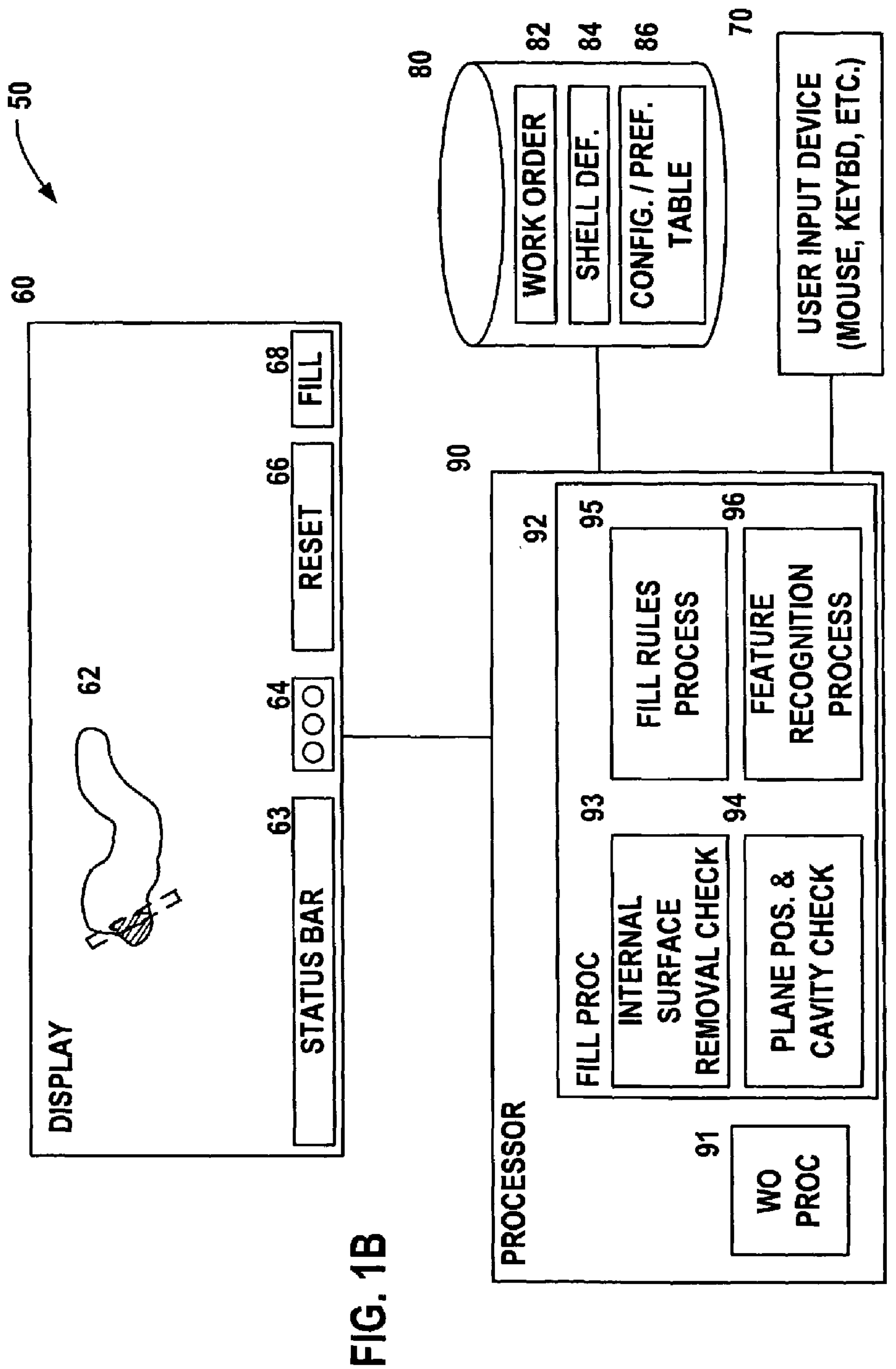
FIG. 1B is a basic system block diagram.

FIG. 1A provides an overview of the process flow 100 according to an embodiment of the invention, and FIG. 1B provides an overview of the system 50 according to an embodiment of the invention.

The system 50 and process 100 may all be implemented by standard computer components that include a processor 90, a display 60, and user input devices 70. By way of example, the processor 90 could be a networked desktop or laptop PC, the display 60 could be a traditional monitor, and the input devices 70 could include a keyboard, mouse, and the like. The various embodiments discussed below are advantageous in that they provide very simple, quick, and straightforward mechanisms for implementing the various described functions of the system.

According to a preferred embodiment of the process 100 illustrated in FIG. 1A, a user loads 110 a work order 82 stored in a database 80 for a particular user's shell into the computer system. The shell definition 84, which is defined by data representing a three-dimensional shape, is presented 62 on the display 60 to the user.

After possibly executing other operations related to the work order 82 or the shell, the user invokes 120 a software fill process 92 that is used to specify fill regions 14 of the shell. When this routine 92 is invoked, in a preferred embodiment, the shell that is displayed 62 can be rendered transparent or translucent.

Figure 2A:
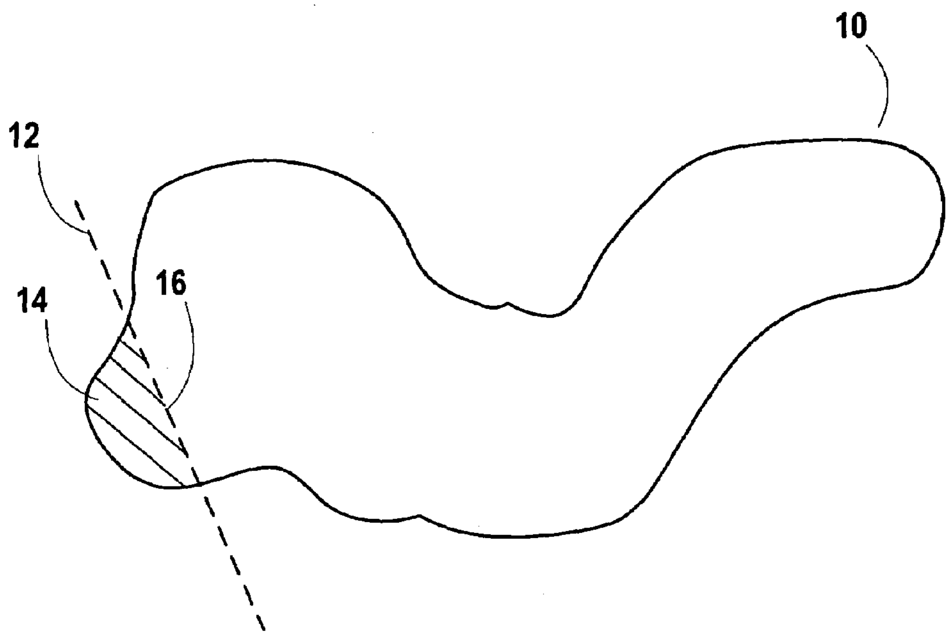
FIGS. 2A&B are pictorial diagrams of a display illustrating the use of a bounding plane to define a fill region.

Next the user identifies the desired fill region 14 of the shell 130. Referring to FIG. 2A, in an exemplary embodiment, in order to define 140 a boundary plane 12, the user moves a mouse 70 outside of the displayed shell 10 and draws a line (plane) 12 (e.g., by clicking and dragging the mouse 70, by separately clicking on two endpoints, or specifying the line or endpoints in some other known manner using the user input devices) respresentative of a plane having an axis in a direction perpendicular to the display 60 and having another perpendicular axis going through the displayed shell 10.

A portion 14 of the shell that is bounded by the plane 12 is shaded or colored with some indicia that indicates it is the defined fill region. This could be done by the use of a color, degree of transparency, or any other form of distinguishing the fill portion of the shell 10 from the non-fill portion. By default, the smallest part of the two regions bounded by the plane 12 would be selected as the fill region 14.

Figure 2B:
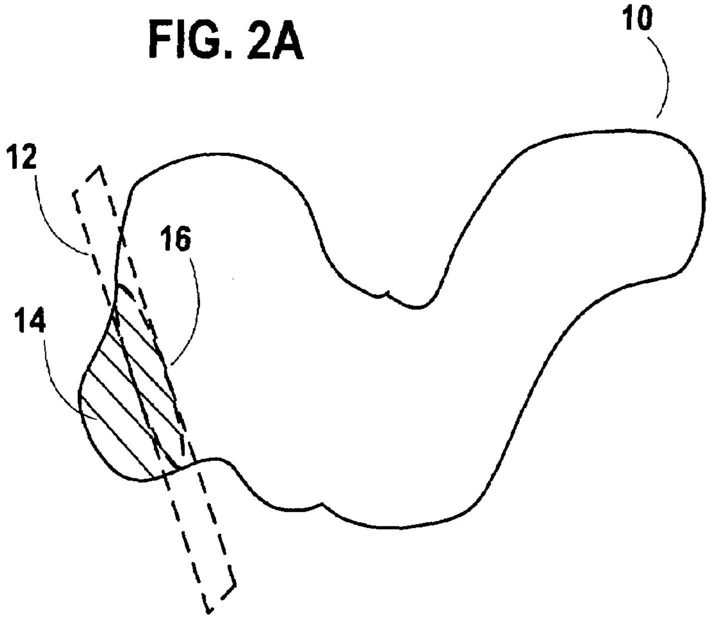

In order to further inspect the selected fill region 14, the three-dimensional model of the shell 10 may be rotated on the display with the user interface of the computer so that the selected fill region can be better displayed. In FIG. 2B, the line 12 that was originally formed becomes a plane, and the linear intersection line becomes an ellipse or other shape 16 defined by the intersection of the plane 12 and the shell 10 as specified by the user.

As indicated above, the fill region 14 can either default to the smaller of the split shell regions, or the user can be required to select the region 150. In either case, however, the non-selected region can be chosen, e.g., by clicking the mouse 70 over the non-selected region, as the selected region by the user via the user interface, if desired.

Furthermore, if the user is not satisfied with the position 160 of the plane 12, the user can repeat the steps described above to specify the new position of the filled area 14. The user interface can be designed so that the drawing of a further line 12 removes the region selected by the drawing of a previous line 12.

When the user is satisfied with the position of the filling plane 12, the user can provide some confirmation 170, via the user interface, indicating that this is the actual desired fill region 14. For example, the user can click a "Fill" button 68 presented on the display 60. This provides an indication to the software 92 that the indicated region 14 should be the fill region, and this fill region is identified by data on the system representative of the three-dimensional fill region. Although any form of such an indication could be provided, a one-mouse-button click provides, in a preferred embodiment, a very simple and easy mechanism for performing this function.

The software may comprise a routine 93 that ensures all surfaces forming the internal shape of the shell are removed in the area where filling is applied. These surfaces include all surfaces in the region 14 except outer shell surface, inner venting channel surface and the selective fill plane.

If the line 12 for selection of the fill plane 12 as drawn by the user intersects the shell 10 more than two times, an individual fill plane 12 can be created for each intersection. Changes of the part selected for filling on one of the Selective Fill Planes can automatically change the filling part 14 in all other filling planes 12.

If the line 12 for selection of the selective fill plane 12 as drawn by the user doesn't intersect the shell more than one time, but if a logical continuation of this line 12 does intersects the shell 10 more than one time, the fill plane(s) 12 located on the logical continuation of the line can be ignored.

This process could be repeated to define multiple fill regions 14 for the shell 10, and the multiple fill regions 14 so defined could either be displayed simultaneously or individually. A selectable display option could be provided so that the current, all, or some (defined by a user selection) of the fill regions are displayed.

In further embodiments of the invention, the fill boundary can take on more complex shapes, e.g., spheres, ellipsoids, or any other three-dimensional surface shapes. Standard computer aided drafting (CAD) techniques could be used to define more complex boundary shapes.

A reset function can be provided, e.g., by way of a reset button 66, so that any or all of the selective fill regions 14 defined can be removed.

The selective fill routines 100 should be able to take into account some critical parts of the inner shell topology of the shell and avoid applying selective fill operations, which could damage the critical parts of the inner shell topology. These critical parts of the inner shell topology can be for example any kind of suspension systems integrated into the shell.

In the event that a fill region 14 has been defined, and subsequent modifications have been performed on the shell shape, the software has a mechanism 64 for alerting the user that the fill region 14 may need to be modified. By way of example, this could be done by a "traffic light" display element 64 having, e.g., red, yellow, and green light elements. A red light would indicate that the shell shape has been modified and that the selective fill process should be performed again to accommodate any changes affecting the fill region 14. A status bar 63 could provide some explanatory text, such as, "Changes in the previous functions have invalidated the Selective Fills. Please either press Reset to confirm that Selective Fills are not needed or make new Selective Fills." The user could then either press Reset 66 to confirm that Selective Fills are not needed or make new Selective Fills. On pressing Reset 66, the traffic light element 64 could become yellow.

The traffic light element 64 can be added to a procedure dialog or toolbar of the display 90 or elsewhere. After each (re-)selection of the area selected to be filled, the traffic light 64 should show whether this selection is allowed.

Various other rules 95 may be utilized in the software for ensuring that only permissible fills are implemented. For example, if the area selected for filling contains the receiver hole, then the "Fill" button 68 should be disabled, and an explanatory message can be provided in the status bar 63. If the area selected for filling 14 contains the complete opening of the shell, then the "Fill" button 68 should be disabled, and an explanatory message can be provided in the status bar 63. If the tip of the shell contains any openinings in addition to the standard opening on the bottom of the shell and the area selected for the filling 14 contains any part of the opening(s) on the tip of the shell, the "Fill" button 68 should be disabled, and an explanatory message can be provided in the status bar 63.

Figure 3A:
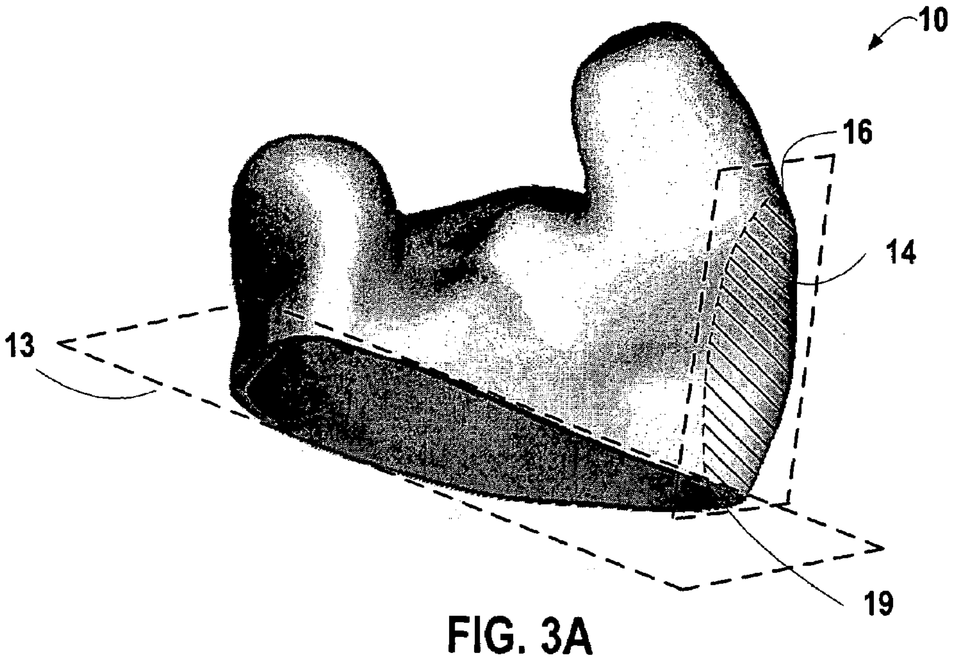
FIGS. 3A&B are pictorial diagrams illustrating cutting planes in a semi-modular shell and non-semi-modular shell.

As illustrated in FIG. 3A, if the area for filling 14 is selected and the selective fill plane 12 intersects the opening 19 on the bottom of the shell, then the plane 13, which defines the bottom of the shell 10, can be used for closing the selective fill plane contour 16 and for the filling operation as the additional boundary of the filled part 14. This case can happen in the case where a non-semi-modular shell is built, as illustrated by FIG. 3A.

Figure 3B:
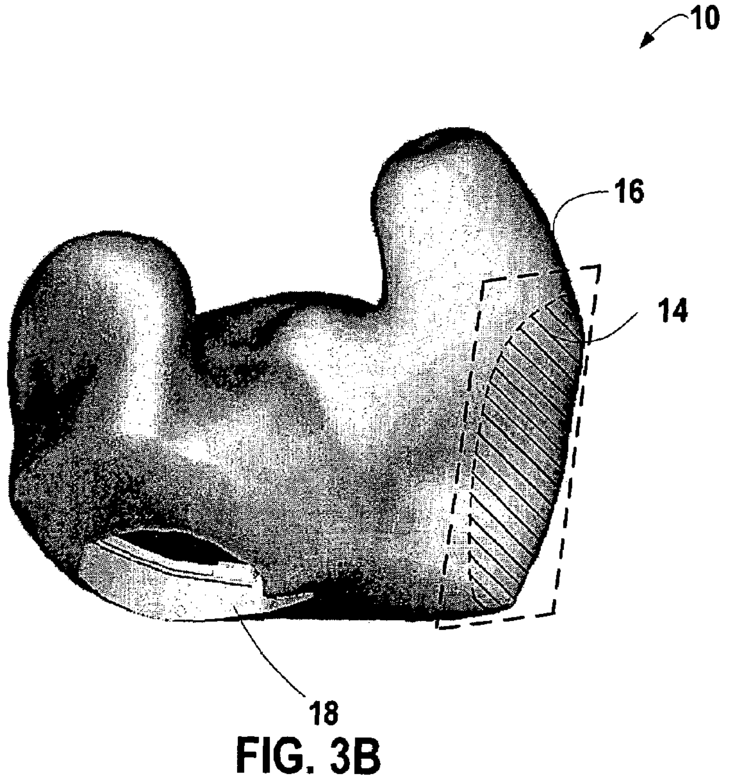

For a semi-modular shell, as illustrated in FIG. 3B, if the area for filling 14 is selected and the selective fill plane 12 intersects the faceplate opening 18 geometry, then the "Fill" button 68 should be disabled, and an explanatory message can be provided in the status bar 63. If selective fill plane does not intersect the faceplate opening, then selective fill can be allowed. This design does not allow use of the cutting plane 12 for the selective fill operation. In the case where the selective fill area 14 has the shell material everywhere except the selective fill plane 12 itself, then selective fill should be allowed. When the selective fill area 14 has some areas, where it borders neither shell material nor the selective fill plane 12 (like in the case when the selective fill plane 12 intersects the faceplate, opening 18), then a fill should not be allowed.

If the area seleted for filling 14 contains any of floating components (such as, but not limited to a receiver, hearing aid electronics, hybrid, WL Coil, etc.), then the "Fill" button 68 could be disabled, and an explanatory message can be provided in the status bar 63.

Various preferences on how the final fill region should be can be provided in the software via, e.g., a configuration edit dialog or preferences table 86. For example, a selective filling color or degree of transparency for rendering the part 14 of the shell 10 selected for filling may be specified in preferences 86. The preferences table 86 can also indicate whether the Receiver, Faceplate, Electronics, and Wireless Coil are rendered in the display 60 or not by default, and it is also possible to indicate in the preferences table 86 whether a Grid is rendered on the display 60 by default in the procedure 92.

In further developments, a feature recognition routine 96, such as that disclosed in U.S. application Ser. No. 11/347,151, herein incorporated by reference, may be used to automatically or assist in identifying the shell fillable areas such as helix, canal, anti-tragus, and to automatically fill these area on the device basis.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential tot he practice of the invention unless the element is specifically described as "essential" or "critical". Numerous modifications and adaptations will be readily apparent to those skilled in this art without departing from the spirit and scope of the present invention.

What is claimed is:

1. A method for defining a selective fill region for a hearing aid shell, comprising:

loading data into a processor of a processor-based system, said data representing a three-dimensional description of a hearing aid shell shape having a generally hollow interior and an exterior surface;

presenting a visual display of the hearing aid shell shape on a display device, said visual display giving said hearing aid shell shape a visual appearance with an appearance characteristic;

operating a user interface of said processor to define and display, in said visual display, a boundary surface that intersects the displayed hearing aid shell shape;

automatically in said processor or by further operation of said user interface, designating a region of the displayed hearing aid shell shape bounded by the boundary surface and the exterior surface as being a fill region;

through said processor, automatically modifying the appearance characteristic display of the designated fill region;

providing an indication to the processor of a portion of the three-dimensional description of said hearing aid shell that is occupied by the fill region;

in said processor, automatically modifying said data to include a three-dimensional description of said portion of said three-dimensional description of said hearing aid shell shape that is occupied by said fill region, thereby producing modified data, and entering said modified data into a data file; and storing the data file in a storage medium of the system.

2. The method according to claim 1, wherein the boundary surface is a plane.

3. The method according to claim 2, wherein the step of defining and displaying a boundary surface comprises drawing a line on the display across boundaries of the displayed shell, which thereby defines a plane projecting perpendicularly from the display.

4. The method according to claim 1, further comprising:

rotating, via a user input control, the display of the shell and the boundary surface through an angle in three-dimensional space.

5. The method according to claim 1, comprising automatically modifying said appearance characteristic by changing a color of the designated fill region.

6. The method according to claim 1, comprising automatically modifying said appearance characteristic by changing an opacity of the designated fill region.

7. The method according to claim 1, further comprising:

automatically performing a validity check according to predetermined rules as to whether the designated fill region is valid; and disabling designation of said fill region if the designated fill region is invalid according to said rules.

8. The method according to claim 7, wherein the validity check comprises:

determining if the designated fill area contains a receiver hole of the hearing aid shell.

9. The method according to claim 7, wherein the validity check comprises:

determining if the designated fill area contains a complete opening of the hearing aid shell.

10. The method according to claim 7, wherein the validity check comprises:

determining if the designated fill area contains floating hearing aid components to be inserted in said hearing aid shell.

11. The method according to claim 1, further comprising:

either automatically in said processor or by further operation of said input unit, changing the shell shape after creating a fill region; and providing an indication to the user at said display that a fill region may need to be redefined after changing the shell shape.

12. The method according to claim 1, further comprising:

designating multiple fill regions for a given shell; and displaying the multiple fill regions on the display.

13. The method according to claim 12, further comprising:

after designating multiple fill regions for a displayed shell shape, automatically in said processor, enabling and disabling each of the multiple fill regions.

14. The method according to claim 1, further comprising: in said processor, automatically ensuring that all surfaces forming an internal shape, except an inner venting channel surface, of the shell shape are removed in the designated fill region.

15. A method as claimed in claim 1 comprising: through said processor, causing a preferences table to be displayed at said display, and wherein said input unit is configured to allow a user to select from among a plurality of preferences displayed in said preference table.

16. The method according to claim 15, wherein the preferences table comprises at least one appearance characteristic selected from the group consisting of color, brightness, or opacity of various elements of the displayed shell, fill region, or intersecting boundary.

17. The method according to claim 1, further comprising: utilizing a cutting plane to designate said boundary surface for the fill region.

18. A method as claimed in claim 1 wherein said three-dimensional description of said hearing aid shell shape comprises a face plate opening for accommodating attachment of a face plate to said hearing aid shell shape and comprising, in said processor, automatically disabling an attempt, by operating said input unit, to designate said fill region if the designated boundary surface intersects said face plate opening.

19. The method according to claim 15, wherein the preferences table comprises at least one element selected from the group consisting of a receiver, a faceplate, hearing aid electronics, a wireless coil, and a grid.

20. A system for defining a selective fill region for a hearing aid shell, comprising:

a processor configured to receive data representing a three-dimensional description of a hearing aid shell shape having a generally hollow interior and an exterior surface;

a display device connected to said processor, said processor being configured to cause a visual display of the hearing aid shell shape at said display device, said visual display giving said hearing aid shell shape a visual appearance with an appearance characteristic;

a user interface of said processor that is operable to define and display, in said visual display, a boundary surface that intersects the displayed hearing aid shell shape;

said processor or said user interface being configured to automatically, or by further operation of said user interface, designate a region of the displayed hearing aid shell bounded by the boundary surface and the exterior surface as being a fill region;

said processor being configured to automatically modify the appearance characteristic display of the designated fill region;

said processor being configured to identify a portion of the three-dimensional description of said hearing aid shell that is occupied by the fill region;

said processor being configured to automatically modify said data to include a three-dimensional description of said portion of said three-dimensional description of said hearing aid shell shape that is occupied by said fill region, thereby producing modified data, and to enter said modified data into a data file; and a storage medium accessible by said processor in which said processor stores said data file.

21. A system as claimed in claim 20 wherein said processor is configured to automatically modify an appearance characteristic selected from the group consisting of a color of the designated fill region and an opacity of the designated fill region.

22. A method as claimed in claim 20 wherein said processor is configured to automatically perform a validity check according to predetermined rules as to whether the designated fill region is wild, and to automatically disable designation of said fill region if the designated fill region is invalid according to said rules.

23. A system as claimed in claim 22 wherein said processor is configured to employ rules to determine at least one of whether the designated fill am contains a receiver fill of the hearing aid shell, whether the designated fill area contains a complete opening of the hearing aid shell, and whether the designated fill am contains floating hearing aid components to be inserted in said hearing aid shell.

24. A system as claimed in claim 20 wherein said processor is configured, either automatically or by operation of said input unit, to change said shell shape after creating a fill region, and to provide an indication to a user at said display that the fill region may need to be redefined after changing said shell shape.

25. A system as claimed in claim 20 wherein said input unit is configured, through said processor, to designate multiple fill regions for the hearing aid shell shape displayed at said display, and wherein said processor is configured to display each of said multiple designated fill regions at said display.

26. A system as claimed in claim 25 wherein said processor is configured to automatically enable to disenable each of the multiple designated fill regions according to predetermined rules.

27. A system as claimed in claim 20 wherein said processor is configured to automatically ensure that all surfaces forming an internal shape of said hearing aid shell shape, accept an inner venting channel surface, are removed in the designated fill region.

* * * * *